United States Patent

[11] 3,576,235

[72] Inventor Daniel L. Bolenbaugh
 South Bend, Ind.
[21] Appl. No. 838,967
[22] Filed July 3, 1969
[45] Patented Apr. 27, 1971
[73] Assignee The Bendix Corporation

[54] BRAKE ADJUSTING SCREW LOCK
 5 Claims, 2 Drawing Figs.
[52] U.S. Cl. .................................................. 188/79.5
[51] Int. Cl. ................................................ F16d 65/56
[50] Field of Search .......................................... 188/79.5
 (GC), 79.5 (SO), 79.5 (SC), 196 (RR), 196 (M)

[56] References Cited
UNITED STATES PATENTS
3,034,603  5/1962  Bauman ...................... 188/79.5(GC)

*Primary Examiner*—Duane A. Reger
*Attorneys*—C.F. Arens and Plante, Arens, Hartz, Hix & Smith ABSTRACT: An adjusting device interposed between the adjacent ends of a pair of brake shoes so as to increase the distance therebetween to compensate for shoe wear, including a coil spring connecting the adjacent shoe ends to the adjusting device to prevent excessive separation of said shoe ends. The coil spring circumscribes the adjusting device, the convolutions of the spring being spaced from abutments on the adjuster.

PATENTED APR 27 1971

3,576,235

INVENTOR.
DANIEL L. BOLENBAUGH
BY Cecil L Arens

ATTORNEY

3,576,235

BRAKE ADJUSTING SCREW LOCK

BACKGROUND OF THE INVENTION

Most automotive vehicles today using drum brakes have brake wear adjusting devices of some type, either manual or automatic. The adjusting device most commonly used, depending somewhat on the type of drum brake employed, is in the form of a screw-threaded connection or strut located between the brakeshoes. This connection is adjusted automatically upon application or release of the brakes, as is well known to those skilled in the art. Also, the connection is sometimes adjusted manually in a manner familiar to those skilled in the art. The connection or strut is most commonly held in adjusting relationship to the adjacent shoe ends by a coil spring interconnecting the shoes. Although the strut is provided with opposed ends in engagement with the respective adjacent shoe ends; if, after a braking application the adjacent shoe ends are permitted to spread apart a distance in excess of some predetermined amount, the strut could actually become disengaged from its associated shoe end, permitting the strut to separate from the adjacent shoe ends. This is particularly a problem on rough streets and roads. This obviously results in a malfunctioning brake.

SUMMARY OF THE INVENTION

Therefore, in view of the foregoing, it is an object of this invention to provide means which will prevent excessive separation between adjacent shoe ends interconnected through a brakeshoe adjusting mechanism.

It is a further object of this invention to control excessive separation between adjacent brakeshoe ends interconnected with an adjusting strut by uniquely utilizing the brakeshoe return spring which holds said shoe ends in operative engagement with said strut.

An important object of the invention resides in the provision of a coil spring, the convolutions of which are spaced from portions of said brake adjusting device to be engaged thereby upon separation between said shoe ends a predetermined distance to thereby restrict further separation.

The above and other objects and features of this invention will be apparent from the following description of the invention taken in connection with the accompanying drawings.

DESCRIPTION OF THE PREFERRED EMBODIMENT

Figure 1:
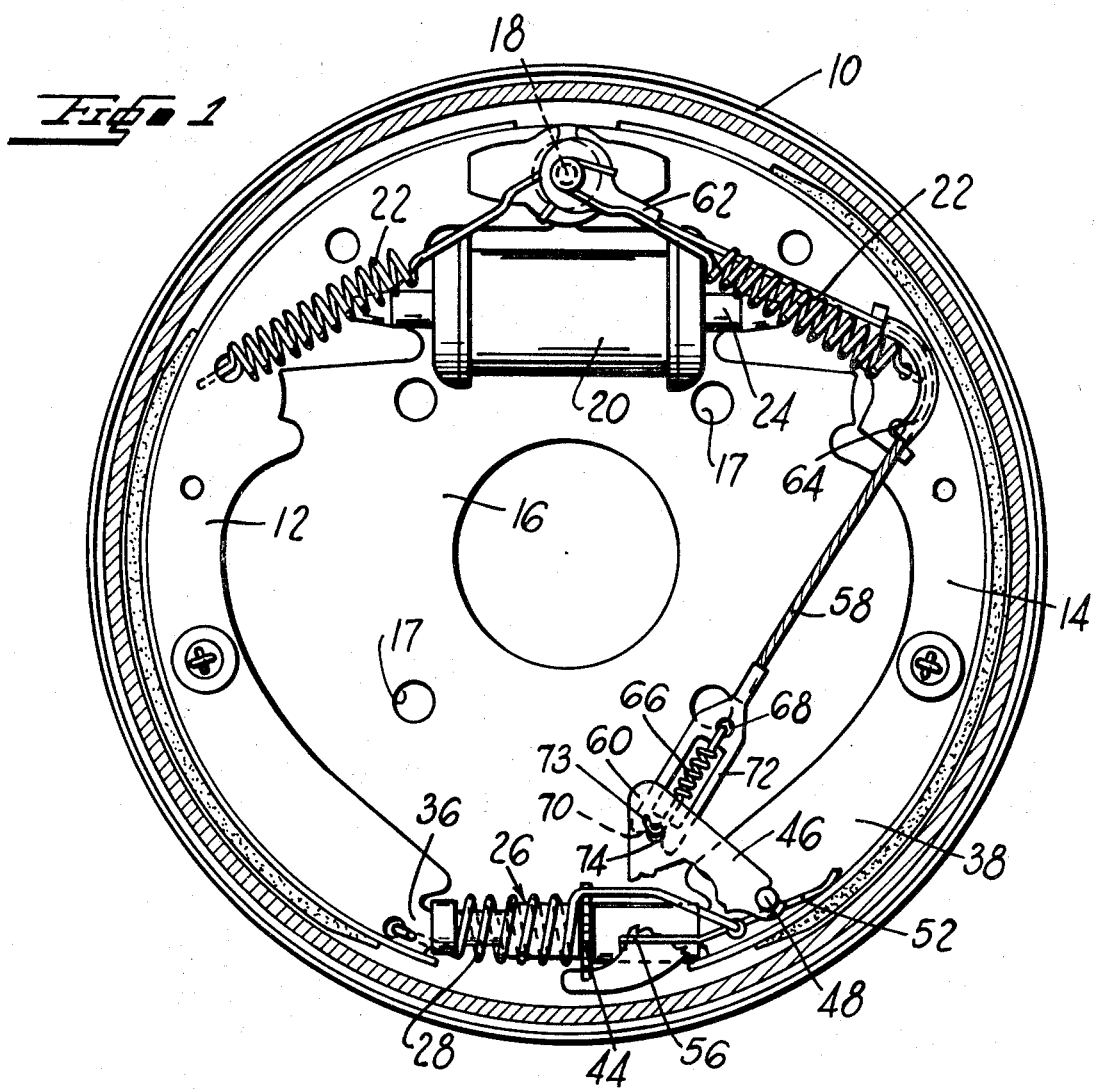
FIG. 1 is a cross-sectional view of a brake in elevation, illustrating a brakeshoe adjusting device incorporating the features of this invention.

Referring now to FIG. 1, it will be noted that the brake with which the device of the invention is associated consists of a brake drum 10 that is carried on the vehicle wheel (not shown) in conventional manner. A pair of brakeshoes 12 and 14 are located within the drum 10 and are stationarily supported on the backing plate 16 which is fixedly secured to the axle housing of the vehicle in conventional manner. Bolt holes 17 are provided in the backing for receiving bolts to mount the backing plate to the axle housing of the vehicle.

The brakeshoes 12 and 14 are arranged on the backing plate in end-to-end relationship for engagement with an anchor pin 18 at one end of the shoes. A brakeshoe applying device 20 is also located between the anchor end of the shoes adjacent anchor pin 18. The brakeshoe applying device 20 may be a conventional type of wheel cylinder, forming a component of a hydraulic brake actuating system. Springs 22 hold the brakeshoes 12 and 14 in engagement with the anchor pin 18 and the force transmitting links 24 of the wheel cylinder or brakeshoe applying device 20. The ends of the brakeshoes 12 and 14 opposite from the anchor pin 18 engage opposed ends of an adjusting device 26. A spring 28 is operatively connected between the adjacent shoe ends for retaining the shoe ends in engagement with the respective opposed ends of the adjusting device.

The adjusting device 26 comprises two elements 30 and 32 threadedly connected together and provided with means for receiving the adjacent ends of the brakeshoes 12 and 14. Element 30 has one end threadedly engaging element 32 and its other end slotted at 34 to receive web 36 of the shoe 12. The element 32 of the adjusting device 26 has one end interiorly threaded for receiving the threaded end of element 30. The end of element 32 which engages the web 38 of shoe 14 is counterbored at 40 to provide a bearing surface 42 against which the lower end of shoe web 38 rides. It is to be noted that the lower end of web 38 fits into the counterbored portion 40 so as to rest on the bearing surface 42 to permit rotation of the element 32 through engagement of a serrated wheel 44 when an adjustment is required. The adjusting device 26 may be extended to compensate for brakeshoe wear through manual or automatic manipulation of the wheel 44 in a manner well known to those skilled in the art. Manual adjustment may be made by inserting a tool through a hole (not shown) in the backing plate for rotating said wheel.

Any of the well-known expedients for automatically adjusting said strut may be employed. As herein shown, a lever 46 is pivotally connected to a pin 48 which is mounted on the web 38 of the shoe 14. A torsion spring 50 has one end 52 engaging an end of brakeshoe 14, and is formed with an intermediate portion 54 wrapped around the pin 48 and has its other end portion 56 engaging the lever 46. The torsion spring 50 accordingly tends to rotate the lever 46 in a counterclockwise direction about the pivot pin 48. Cable 58 is attached to an upper portion 60 of the lever 46 and is further connected to the anchor pin 18 through eyelet 62 secured to the cable 58. A cable guide 64 is mounted on the brakeshoe 14 and slidably receives the cable 58. In order to prevent overstressing the cable 58 and other parts of the automatic adjuster during a brake adjustment, a prestressed spring 66 is interconnected between an opening 68 and a slot 70 of a cage 72. The lower end of the prestressed spring is formed with a hook 73 which engages one side of an opening 74 in the upper portion 60 of the lever 46. The automatic adjuster herein disclosed forms no part of the invention but is illustrated as one form of automatic adjuster which may be used with the brake.

Figure 2:
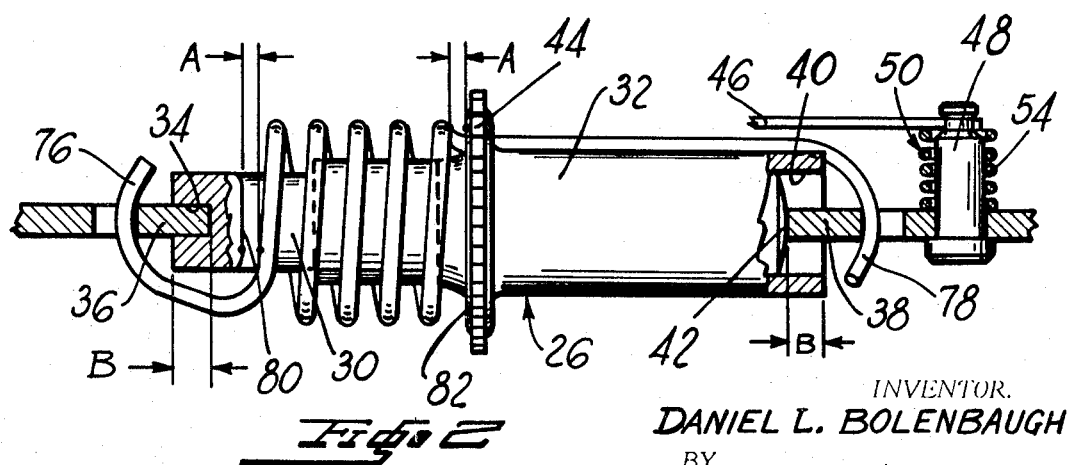
FIG. 2 is an enlarged fragmentary view of the brake showing the adjusting strut and its arrangement between the adjacent shoe ends.

As will be observed in FIG. 2, the coil spring 28 is formed with hooks 76 and 78 engaging, respectively, the webs 36 and 38 of the adjacent ends of brakeshoes 12 and 14. In the released condition of the brake the coil spring 28 is of such overall length, from hook 76 to hook 78, that the web 36 is urged against the bottom of the slot 34 of the element 30 and the web 38 is urged against the bearing surface 42 of the element 32 to thereby retain the adjusting device in operative engagement between said adjacent ends of the brakeshoes. The two threadedly connected elements 30 and 32 of the adjusting device 26 are not only provided with means for receiving the shoe webs 36 and 38 but further include axially spaced abutment portions 80 and 82 against which the convolutions of the spring 28 bear upon a predetermined amount of separation between said adjacent shoe ends.

The depth of the slot in the end 34 and the depth of the bearing 42 in the counterbore 40 are of predetermined length B. The maximum separation of either adjacent shoe end from its associated end of the adjusting device 26 is confined to a distance A measured between abutments 80 and 82 and their respective adjacent convolutions of the spring 28. This distance A is less than B so that separation between the adjacent shoe ends cannot withdraw said shoe ends from their associated ends of the adjusting device. Accordingly, the spring 28 not only retains the shoe to shoe engagement with the adjusting device but performs an additional function of trapping the adjusting device between the adjacent shoe ends. The spring 28 restricts the adjusting device from moving away from either shoe any further than a predetermined distance A.

Although this invention has been described in connection with certain specific embodiments it will be obvious to those skilled in the art that various changes may be made in the form, structure and arrangement of parts without departing from the spirit of the invention.

Having thus described the various embodiments of the invention, what I claim as new and desire to secure by Letters Patent is:

I claim:

1. In a brake having two brakeshoes and a brakeshoe adjusting device positioned between adjacent ends of said shoes for adjusting said shoes to compensate for shoe wear, said device comprising two elements threadedly interconnecting one another and provided with receiving means for locating the adjacent ends of said shoes, and spring means operatively connecting said adjacent ends to thereby retain said ends in said receiving means in adjustable relationship to said device, said spring means having abutments thereon to be engaged by portions of said device upon separation between said adjacent ends and said device of a predetermined amount whereby further separation is precluded.

2. In a brake having two brakeshoes and a brakeshoe adjusting device positioned between adjacent ends of said shoes for adjusting said shoes upon occurrence of a predetermined amount of wear, said device comprising two elements threaded together and provided with means for receiving the adjacent ends of the shoes, and a coil spring operatively connected between said adjacent shoe ends and having convolutions which circumscribe said device, said convolutions being engageable with portions of said device upon a predetermined amount of separation between said adjacent shoe ends and said device to thereby restrain said shoe ends from further separation.

3. The structure as recited in claim 2 wherein one of said convolutions is spaced axially a predetermined distance from one of said elements to be engaged thereby when separation of said adjacent shoe ends exceeds said distance.

4. The structure as recited in claim 2 wherein said coil spring is formed with one convolution which is spaced axially a predetermined distance from one of said elements to be engaged thereby and a second convolution which is spaced axially a predetermined distance from the other of said elements to be engaged thereby so that separation between adjacent shoe ends and said device is limited to the combined predetermined distances said first and second convolutions are spaced respectively from said one of said elements and said other of said elements.

5. In a brake having two brakeshoes and a brakeshoe adjusting device positioned between adjacent ends of said shoes for adjusting said shoes upon occurrence of a predetermined amount of wear, said device comprising two elements threadedly interconnecting one another and provided with means for receiving the adjacent ends of said shoes, and a coil spring operatively connected between said adjacent shoe ends and having convolutions through which said device projects, said device further having axially spaced abutments thereon for engagement with said convolutions when separation between said adjacent shoe ends and said device exceed a predetermined distance whereby said shoe ends are restrained from further separation.